(12) United States Patent
Narayanan et al.

(10) Patent No.: US 8,949,720 B1
(45) Date of Patent: Feb. 3, 2015

(54) SYSTEMS AND METHODS FOR MANAGING ACCESS-CONTROL SETTINGS

(75) Inventors: Aravinthan Narayanan, West KK Nagar (IN); Yadvinder Bhatia, Punjab (IN)

(73) Assignee: Symantec Corporation, Mountain View, CA (US)

( * ) Notice: Subject to any disclaimer, the term of this patent is extended or adjusted under 35 U.S.C. 154(b) by 396 days.

(21) Appl. No.: 13/103,550

(22) Filed: May 9, 2011

(51) Int. Cl.
  *G06F 3/00* (2006.01)
  *G06F 3/048* (2013.01)

(52) U.S. Cl.
  USPC ............................ 715/741; 715/745; 715/815

(58) Field of Classification Search
  USPC .............. 715/741–743, 745, 815; 726/26–30; 709/224–225; 345/173
  See application file for complete search history.

(56) References Cited

U.S. PATENT DOCUMENTS

| | | | | | |
|---|---|---|---|---|---|
| 5,542,039 | A | * | 7/1996 | Brinson et al. | 715/800 |
| 5,548,345 | A | * | 8/1996 | Brian et al. | 725/27 |
| 6,025,869 | A | * | 2/2000 | Stas et al. | 725/28 |
| 7,640,336 | B1 | * | 12/2009 | Lu et al. | 709/224 |
| 7,817,168 | B2 | * | 10/2010 | Nagiyama et al. | 345/661 |
| 2002/0032696 | A1 | * | 3/2002 | Takiguchi et al. | 707/500.1 |
| 2002/0075302 | A1 | * | 6/2002 | Simchik | 345/745 |
| 2003/0005135 | A1 | * | 1/2003 | Inoue et al. | 709/229 |
| 2004/0143838 | A1 | * | 7/2004 | Rose | 725/25 |
| 2004/0221303 | A1 | * | 11/2004 | Sie et al. | 725/29 |
| 2005/0060581 | A1 | * | 3/2005 | Chebolu et al. | 713/201 |
| 2006/0206818 | A1 | * | 9/2006 | Utter et al. | 715/705 |
| 2007/0011622 | A1 | * | 1/2007 | Chae et al. | 715/764 |
| 2007/0061459 | A1 | * | 3/2007 | Culbreth et al. | 709/225 |
| 2007/0245367 | A1 | * | 10/2007 | Ogawa | 725/28 |
| 2008/0222569 | A1 | * | 9/2008 | Champion et al. | 715/834 |
| 2009/0144282 | A1 | * | 6/2009 | Uramoto | 707/9 |
| 2009/0158167 | A1 | * | 6/2009 | Wang et al. | 715/745 |
| 2010/0010646 | A1 | * | 1/2010 | Drew et al. | 700/86 |
| 2010/0058446 | A1 | * | 3/2010 | Thwaites | 726/4 |
| 2010/0281408 | A1 | * | 11/2010 | Fujioka et al. | 715/765 |
| 2011/0236872 | A1 | * | 9/2011 | Taylor | 434/350 |
| 2011/0283311 | A1 | * | 11/2011 | Luong | 725/28 |
| 2011/0307792 | A1 | * | 12/2011 | DeLuca | 715/736 |

\* cited by examiner

*Primary Examiner* — Amy Ng
*Assistant Examiner* — William Wong
(74) *Attorney, Agent, or Firm* — ALG Intellectual Property, LLC

(57) ABSTRACT

A computer-implemented method for managing access-control settings may include identifying an initial access-control setting that controls a user's access to a computing resource. The method may also include displaying, via a graphical user interface, a representation of the computing resource. The method may further include receiving input that resizes the representation of the computing resource from an initial size to a new size, detecting the new size of the representation of the computing resource, and modifying the initial access-control setting to establish an updated access-control setting that corresponds to the new size of the representation of the computing resource. Various other methods, systems, and computer-readable media are also disclosed.

17 Claims, 7 Drawing Sheets

SYSTEMS AND METHODS FOR MANAGING ACCESS-CONTROL SETTINGS

BACKGROUND

Children increasingly use computers to communicate with friends, to complete homework assignments, to listen to and view media, to play games, and to participate in a variety of other activities. Parents may use traditional parental-control software to set usage limits and other restrictions on a child's computer activities. Unfortunately, traditional parental-control software may not provide intuitive interfaces that enable a parent to quickly and effectively set limits on how and when a child uses a computer. For example, traditional parental-control software systems may not provide interfaces that are quick and easy to use on a mobile touch screen device. What is needed, therefore, is a more effective and efficient interface for enabling parents to manage access-control settings.

SUMMARY

As will be described in greater detail below, the instant disclosure generally relates to systems and methods for managing access-control settings. For example, a method for managing access-control settings may include: 1) identifying an initial access-control setting (e.g., a parental-control setting) that controls a user's access (e.g., a child's access) to a computing resource (e.g., an online resource); 2) displaying, via a graphical user interface, a representation of the computing resource; 3) receiving input that resizes the representation of the computing resource from an initial size to a new size; 4) detecting the new size of the representation of the computing resource; and 5) modifying the initial access-control setting to establish an updated access-control setting that corresponds to the new size of the representation of the computing resource.

In certain embodiments, the graphical user interface may be any suitable type of interface, such as a touch-screen interface or other display interface. In embodiments where the graphical user interface is a touch-screen interface, the input that resizes the representation may be received via the touch-screen interface.

The representation of the computing resource may be displayed in a variety of manners and contexts. For example, displaying the representation of the computing resource may include using the initial access-control setting to select the initial size of the representation of the computing resource. In such embodiments, the representation of the computing resource may be displayed such that the initial size of the representation of the computing resource corresponds to the initial access-control setting. Additionally or alternatively, displaying the representation of the computing resource may include: 1) identifying usage information that indicates how frequently the user accesses the computing resource; 2) using the usage information to select the initial size of the representation of the computing resource; and 3) displaying the representation of the computing resource such that the initial size of the representation of the computing resource corresponds to how frequently the user accesses the computing resource.

The input that resizes the representation of the computing resource may be received in various manners. For example, receiving the input that resizes the representation of the computing resource from an initial size to a new size may include receiving input that reduces a width of the representation of the computing resource. In such embodiments, modifying the initial access-control setting to establish an updated access-control setting may reduce access (e.g., reduce an amount of time that the user is allowed to access the computing resource) to the computing resource such that the updated access-control setting is more restrictive than the initial access-control setting.

Additionally or alternatively, receiving input that resizes the representation of the online resource from an initial size to a new size may include receiving input that reduces a height of the representation of the computing resource. In such embodiments, modifying the initial access-control setting to establish an updated access-control setting may include reducing a length of time for which a control parameter of the initial access-control setting is applied.

The representation of the computing resource may be displayed in many different contexts. For example, displaying the representation of the computing resource may include displaying a plurality of representations of computing resources, and the plurality of representations of computing resources may be displayed in order according to a frequency with which the user accesses respective computing resources. In such embodiments, a first representation that is associated with a more frequently accessed computing resource may be displayed above and/or left of a second representation that is associated with a less frequently accessed computing resource.

According to certain embodiments, the aforementioned method may also include determining that the computing resource is accessed more frequently by the user than an additional computing resource and, based on the determination that the computing resource is accessed more frequently by the user than an additional computing resource, displaying a representation of the additional computing resource such that the representation of the additional computing resource is smaller than the representation of the computing resource.

In some embodiments, a system for managing access-control settings may include an identification module programmed to identify an initial access-control setting that controls a user's access to a computing resource. The system may also include a display module programmed to display, via a graphical user interface, a representation of the computing resource. The system may further include an input module programmed to receive input that resizes the representation of the computing resource from an initial size to a new size and a detection module programmed to detect the new size of the representation of the computing resource. The system may additionally include a modification module programmed to modify the initial access-control setting to establish an updated access-control setting that corresponds to the new size of the representation of the computing resource.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
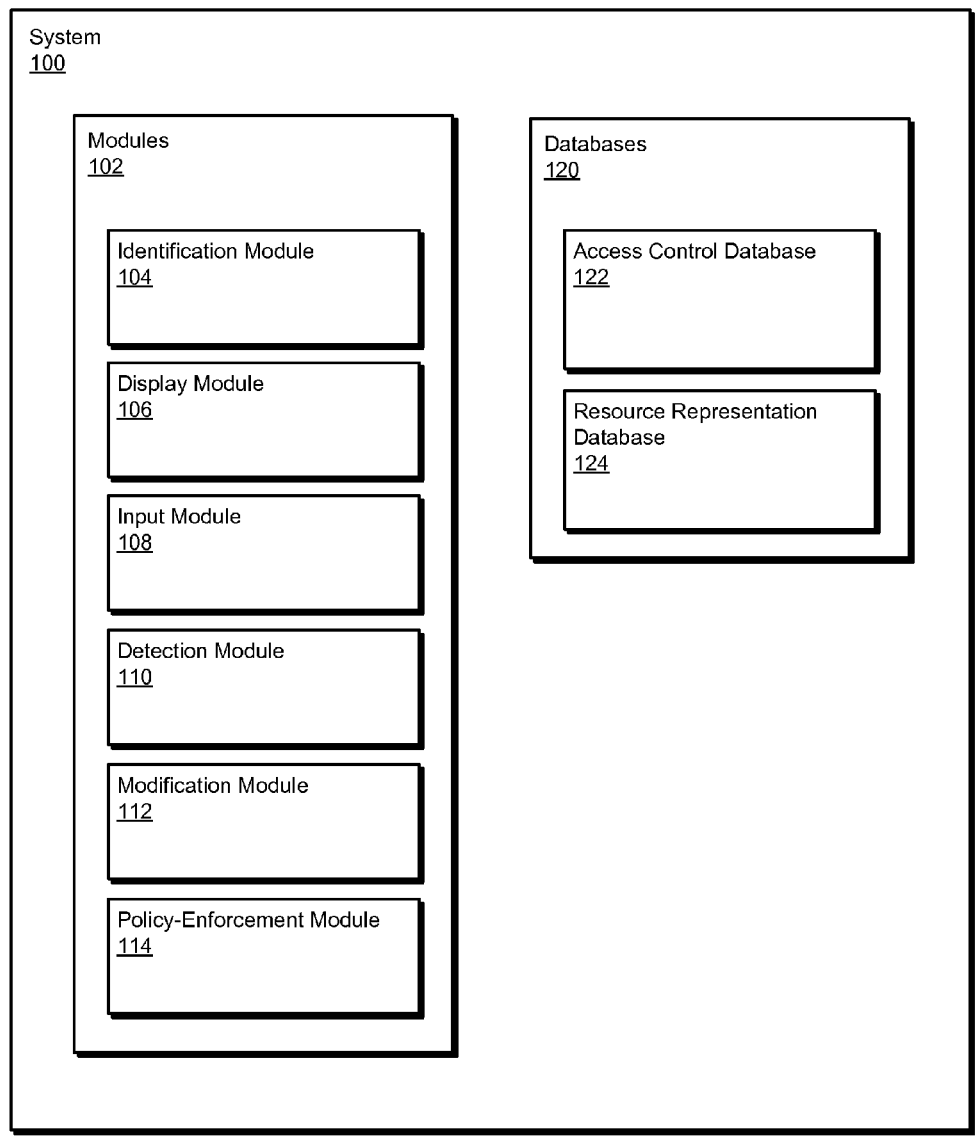
FIG. 1 is a block diagram of an exemplary system for managing access-control settings.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for managing access-control settings. For example, systems and methods described herein may enable an administrator (e.g., a parent) to modify a setting that controls a user's (e.g., child's) access to a computing resource by resizing an icon or other display element associated with a computing resource. In this manner, the systems and methods described herein may provide an intuitive, efficient, and effective interface for modifying access-control settings on touch screen devices (e.g., tablet computing devices, smartphones, etc.) and/or various other types of computing devices. Embodiments presented herein may also provide various other features and advantages.

Figure 2:
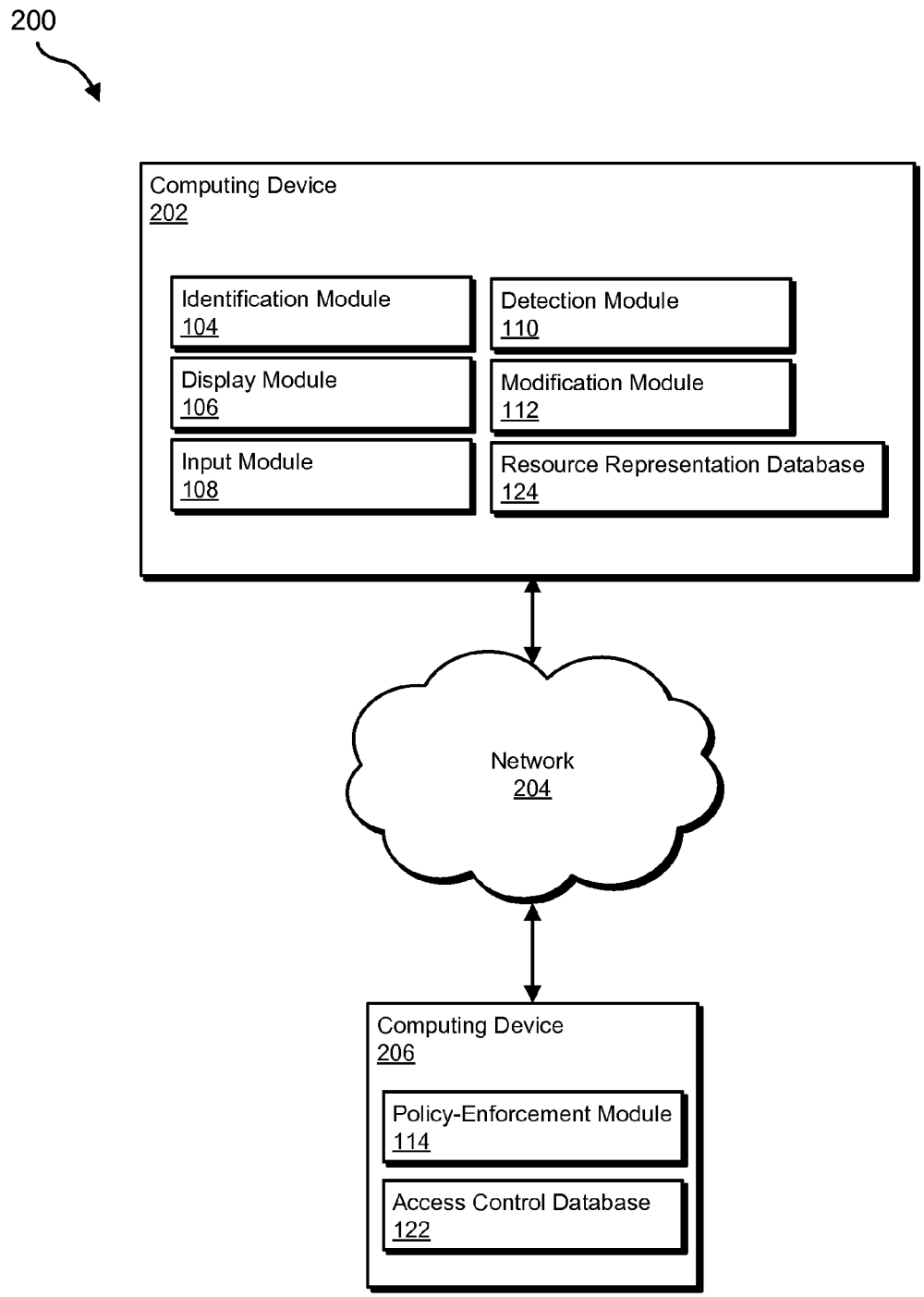
FIG. 2 is a block diagram of another exemplary system for managing access-control settings.

The following will provide, with reference to FIGS. 1-2, detailed descriptions of exemplary systems for managing access-control settings. Detailed descriptions of corresponding computer-implemented methods will also be provided in connection with FIG. 3. Detailed descriptions of exemplary interfaces will be provided in the discussion corresponding to FIG. 4, FIG. 5A, and FIG. 5B. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for managing access-control settings. As illustrated in this figure, exemplary system 100 may include one or more modules 102 for performing one or more tasks. For example, and as will be explained in greater detail below, exemplary system 100 may include an identification module 104 programmed to identify an initial access-control setting that controls a user's access to a computing resource. Exemplary system 100 may also include a display module 106 programmed to display, via a graphical user interface, a representation of the computing resource.

In addition, and as will be described in greater detail below, exemplary system 100 may include an input module 108 programmed to receive input that resizes the representation of the computing resource from an initial size to a new size.

System 100 may also include a detection module 110 programmed to detect the new size of the representation of the computing resource and a modification module 112 programmed to modify the initial access-control setting to establish an updated access-control setting that corresponds to the new size of the representation of the computing resource. As also shown in FIG. 1, system 100 may include a policy-enforcement module 114 programmed to enforce one or more access control policies. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202 and/or computing device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include an access control database 122 for storing access control policies and a resource representation database 124 for storing representation (e.g., icons) of computing resources. Access control database 122 and/or resource representation database 124 may also store associations between resource representations and access control policies.

Databases 120 in FIG. 1 may represent a portion of one or more computing devices. For example, databases 120 may represent a portion of computing device 202 and/or 206 in FIG. 2, computing system 610 in FIG. 6, and/or portions of exemplary network architecture 700 in FIG. 7. Alternatively, databases 120 in FIG. 1 may represent one or more physically separate devices capable of being accessed by a computing device, such as computing device 202 and/or 206 in FIG. 2, computing system 610 in FIG. 6, and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing device 202 in communication with a computing device 206 via a network 204. Computing device 202 may represent an administrator's (e.g., parent's) computing device and may include identification module 204, display module 206, input module 208, detection module 210, modification module 212, and resource representation database 224. Computing device 206 may represent a user's (e.g., child's) computing device and may include policy enforcement module 222 and access control database 122. An administrator may use computing device 202 to create access-control settings for a user, and the user may access computing resources, subject to the access-control settings set by the administrator, via computing device 206. For example, policy-enforcement module 114 may implement access-control settings by controlling the user's access to one or more computing resources.

While FIG. 2 shows modules 104-112 and database 124 located on computing device 202, any of these elements may be partially or completely located on computing device 206. Similarly, all or a portion of policy-enforcement module 114 and/or access control database 122 may be located on computing device 202 rather than computing device 206. Furthermore, embodiments of the instant disclosure may be implemented on a single computing device or within two or more computing devices.

Computing devices 202 and/or 206 generally represent any type or form of computing devices capable of reading computer-executable instructions. Examples of computing devices 202 and/or 206 include, without limitation, laptops, tablet devices, desktops, servers, cellular phones, touch-screen devices (e.g., devices with capacitive touch screens, infrared touch screens, optical imaging touch screens, etc.), personal digital assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing device 202 and computing device 206.

Figure 3:
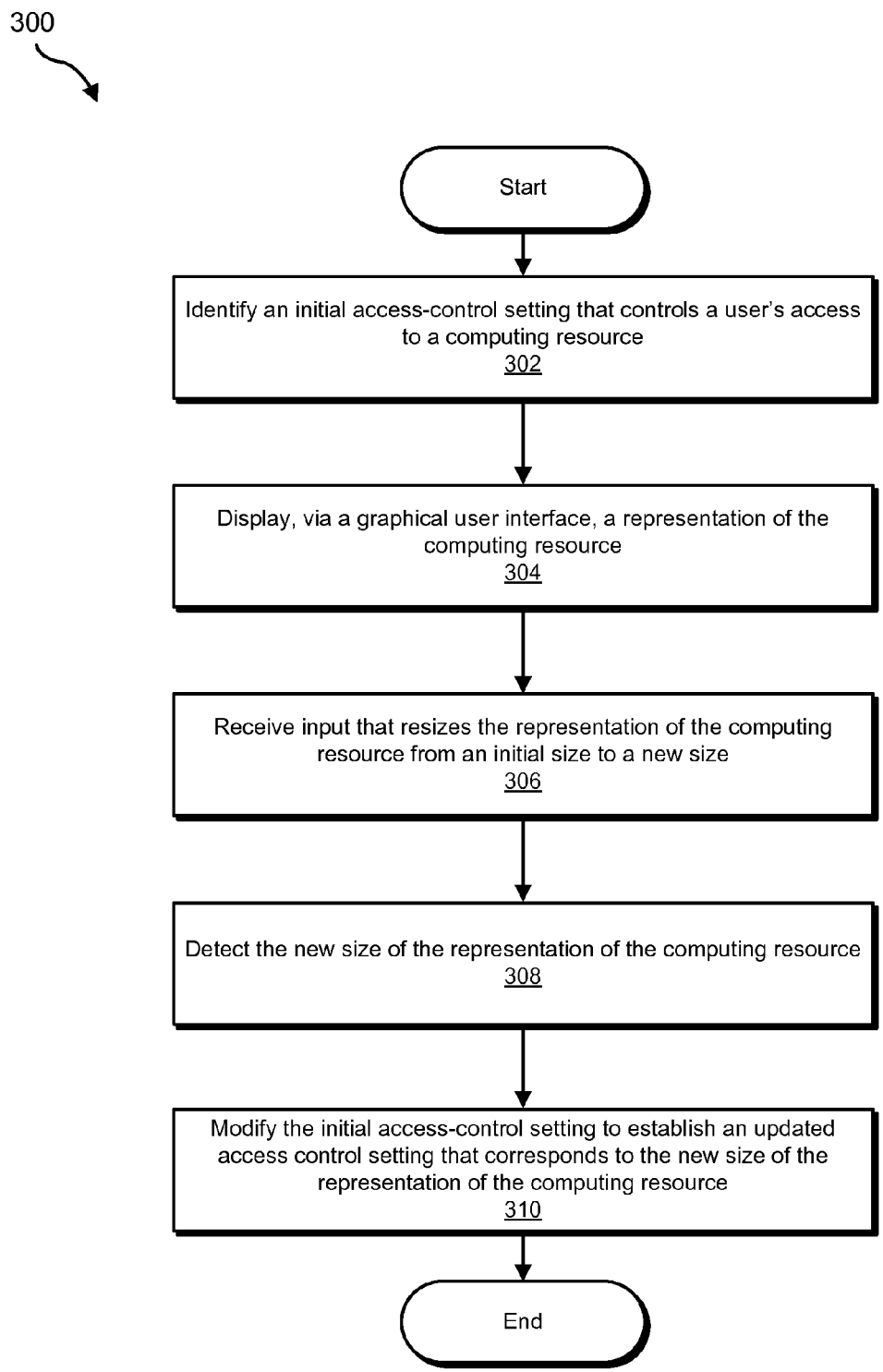
FIG. 3 is a flow diagram of an exemplary method for managing access-control settings.

FIG. 3 is a flow diagram of an exemplary computer-implemented method 300 for managing access-control settings. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

At step 302, one or more of the systems described herein may identify an initial access-control setting that controls a user's access to a computing resource. For example, identification module 104 may, as part of computing device 202 in FIG. 2, identify an initial access-control setting in access control database 122 that controls a user's access to a computing resource via computing device 206.

As used herein, the phrase "access-control setting" generally refers to any setting and/or policy used to control access to computing resources. Access-control settings may define policies that restrict, limit, prohibit, or otherwise control activities of one or more users. For example, access-control settings may define conditions and limitations on a child's use of particular computer resources. As another example, access-control settings may define policies that limit access to various types of objectionable content and/or content that may be inappropriate for children of a particular age. In some embodiments, an access-control settings may set forth approved or prohibited websites and/or other computing resources. An access-control setting may also set forth file permissions for a child and/or may define access control for other computer resources.

As used herein, the phrase "computing resource" generally refers to any type or form of resource available for via a computing device. For example, a computing resource may include an online resource, such as a web page, a social networking website, streaming media, a cloud-based application, and/or any other type of data accessible via the Internet. A computing resource may additionally or alternatively include a resource located on a local area network (e.g., a network printer, a network storage device, etc.) In some embodiments, a computing resource may include a resource on a local computing device, such as a media drive (e.g., an optical disk drive), an application installed on the local computing device (e.g., an instant messenger application, an email application, a game, etc.), a data file on the local computing device, and/or any other local resource.

Access-control settings may be used to control access to computing resources in a variety of contexts. For example, an access-control setting may be a parental-control setting used by a parent (or other guardian) to control a child's computing activities. In other embodiments, an access-control setting may be implemented by a network administrator in an enterprise environment to provide access controls for one or more users within the enterprise environment.

At step 304 in FIG. 3, one or more of the systems described herein may display, via a graphical user interface, a representation of the computing resource. For example, display module 106 may, as part of computing device 202 in FIG. 2, display a representation of the computing resource via graphical user interface of computing device 206.

As used herein, the phrase "representation of a computing resource" generally refers to any visual depiction of one or more computing resources. For example, a representation of a computing resource may be an icon that depicts the computing resource, a logo associated with the computing resource, a word or phrase that describes and/or is otherwise associated with the computing resource, and/or any other representation of a computing resource. As another example, a representation of a computing resource may be associated with multiple computing resources (e.g., related websites and/or other groups of resources).

Display module 106 may display a representation of the computing resource in a variety of ways and/or via a variety of different display mechanisms. For example, display module 106 may display the representation of the computing resource in a manner that corresponds to the initial access-control setting identified in step 302. In such embodiments, display module 106 may use the initial access-control setting to select the initial size of the representation of the computing resource and may display the representation of the computing resource such that the initial size of the representation of the computing resource corresponds to the initial access-control setting. As an example, if the initial access-control setting indicates that access to the computing resources is relatively limited with respect to other computing resources, the representation of the computing resource may sized to be smaller that representations of the other computing resources.

Instead of (and/or in addition to) being tied to the initial access-control setting, the size of the representation of a computing resource may be associated with how much a user accesses the resource. For example, display module 106 may identify usage information that indicates how frequently a user accesses the computing resource and may use the usage information to select the initial size of the representation of the computing resource. In such embodiments, the representation of the computing resource may be displayed such that the initial size of the representation of the computing resource corresponds to how frequently the user accesses the computing resource and/or the amount of time the user spends accessing the computing resource. For example, display module 106 may determine that a first computing resource is accessed more frequently by the user than a second computing resource, and based on the determination that the first computing resource is accessed more frequently by the user than the second computing resource, may display a representation of the second computing resource such that the representation of the second computing resource is smaller than the representation of the first computing resource. In this manner, displaying the representation of the computing resource may provide a parent (or other administrator) with information about a child's (or other user's) usage of the computing resource.

Representations of multiple (e.g., two or more) computing resources may displayed via a graphical user interface at the same time. In such embodiments, the representations of the computing resources may be displayed in order according to a frequency with which the user accesses respective computing resources, such that a first representation that is associated with a more frequently accessed computing resource is displayed above and/or left of a second representation that is associated with a less frequently accessed computing resource. Additionally or alternatively, the representations of the computing resources may be displayed in order according to a the amount of time a user spends accessing the respective computing resources. By viewing a graphical user interface that orders representations of resources according to access frequency and/or usage time, a parent (or other administrator) may be able to quickly assess a child's (or other user's) relative usage of various online resources.

In other embodiments, the representations of the computing resources may be ordered with respect to corresponding access-control settings (e.g., representations associated with resources having relatively permissive access-control settings may be displayed above and/or to the left of resources having relatively limited access-control settings). For example, if a first resource may be accessed 10 times a day and a second resource may be accessed 5 times a day, a representation of the first resource may be displayed above and/or to the left of a representation of the second resource.

Figure 4:
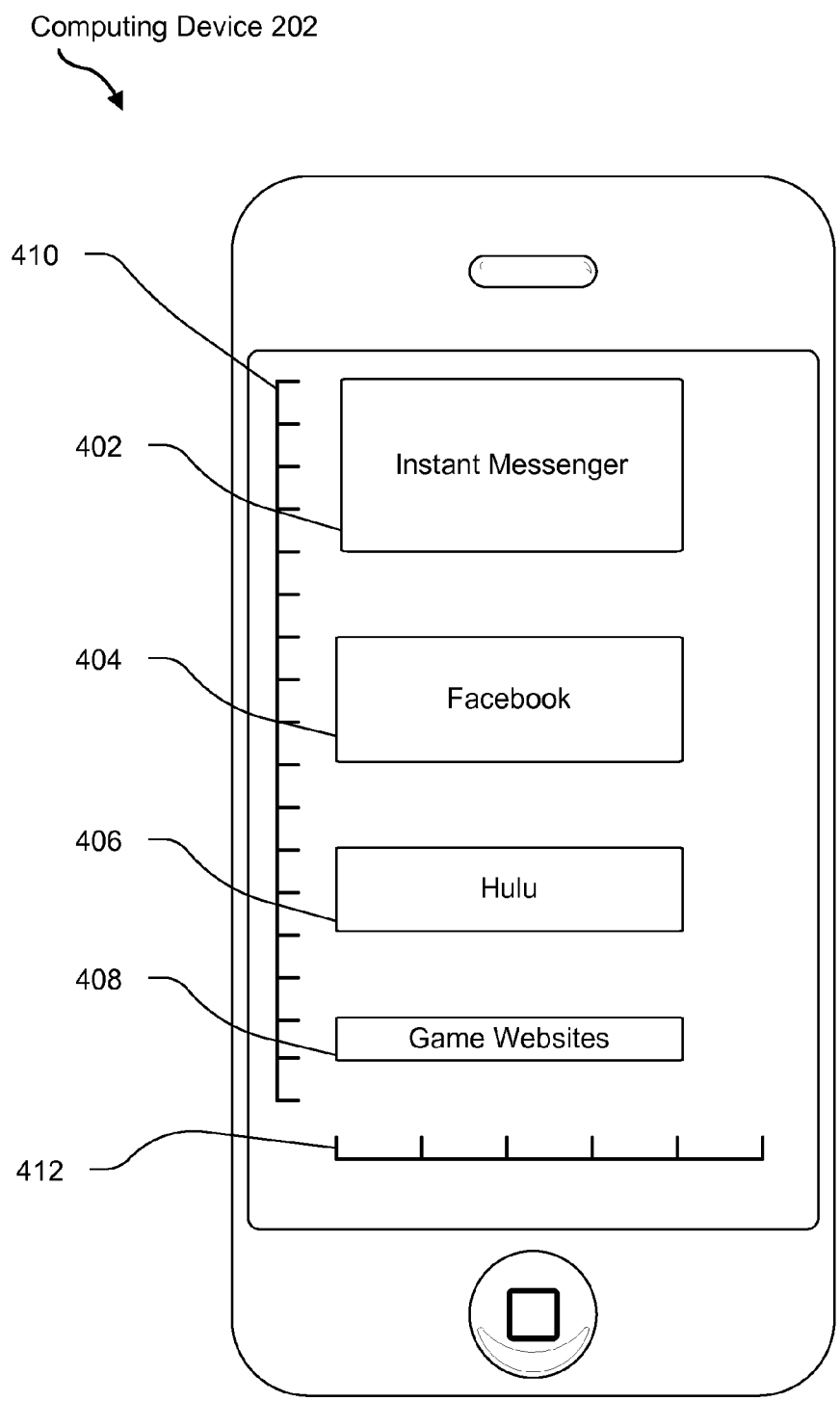
FIG. 4 is a block diagram of an exemplary interface for managing access-control settings.

FIG. 4 shows an example of how representations of computing resources may be displayed on computing device 202. As shown in FIG. 4, computing device 202 may be a touch-screen telephone. A touch-screen interface of computing device 202 may display an instant messenger graphic 402, a FACEBOOK graphic 404, a HULU graphic 406, and a game websites graphic 408. FACEBOOK is a registered trademark of FACEBOOK, INC. and HULU is a registered trademark of HULU, LLC. In the example shown in FIG. 4, the representations of the resources may be sized to correspond to a frequency with which a user accesses the resources. For example, instant messenger may be the most frequently accessed resource and game websites may be the least frequently accessed resource.

Computing device 202 may also display a y-axis 410 and an x-axis 412. Y-axis 410 and/or x-axis 412 may represent any type of access control parameter. For example, y-axis 410 and/or x-axis 412 may represent the amount of time a user is allowed to access a computing resource (e.g., defined in hours, minutes, seconds, etc.), the frequency with which a user is allowed to access a computing resource (ten times a month, 5 times a day, etc.), a relative percentage of time that a user is allowed to access a computing resource (e.g., a user may spend 10% of all allotted computer user time using a particular resource), a maximum content rating that a user is permitted to view (e.g., G-rated movies, PG-rated movies, PG-13-rated movies, E-rated video games, T-rated video games, M-rated video games, etc.).

As an example, y-axis 410 may indicate the frequency with which a resource is accessed (e.g., each unit along y-axis 410 may indicate 10 accesses). X-axis 412 may indicate a time period for which the access to computing resources applies (e.g., each unit along x-axis 412 may indicate one week). In this example, instant messenger may be accessed 40 times every 4 weeks, FACEBOOK may be accessed 30 times every 4 weeks, HULU may be accessed 20 times every four weeks, and game websites may be accessed 10 times every four weeks.

While FIG. 4 shows that computing device 202 displays y-axis 410 and x-axis 412 along with corresponding unit markers, in other embodiments axes and/or corresponding unit markers may not be displayed. Further, in some embodiments the sizes of representations of computing resources may not correspond directly to a linear (or non-linear) scale on an x-axis or y-axis. For example, representations of computing resources may be sized relatively rather than absolutely. In other words, representations of computing resources may be sized relative to one another (e.g., more frequently accessed resources may be taller and/or wider than less frequently accessed resources) without necessarily being sized with respect to any fixed scale.

At step 306, one or more of the systems described herein may receive input that resizes the representation of the computing resource from an initial size to a new size. For example, input module 108 may, as part of computing device 202 in FIG. 2, receive input that resizes the representation of the computing resource from an initial size to a new size.

Input module 108 may receive input that resizes a representation of a computing resource in a variety of different contexts. For example, input module 108 may receive touch input on a touch screen device when a user drags one or more edges of a representation of a computing resource to make the resource larger or smaller. Alternatively, input module 108 may receive touch-pad input, mouse input, keyboard input, audio input, and/or any other type of user input suitable for resizing a representation of a computing resource.

Input module 108 may receive input that decreases and/or increases the size of a representation of a computing resource. For example, input module 108 may receive input that makes a representation of a computing resource taller (e.g., along a y-axis) and/or wider (e.g., along an x-axis). Additionally or alternatively, input module 108 may receive input that makes a representation of a computing resource shorter (e.g., along a y-axis) and/or narrower (e.g., along an x-axis).

Figure 5A:
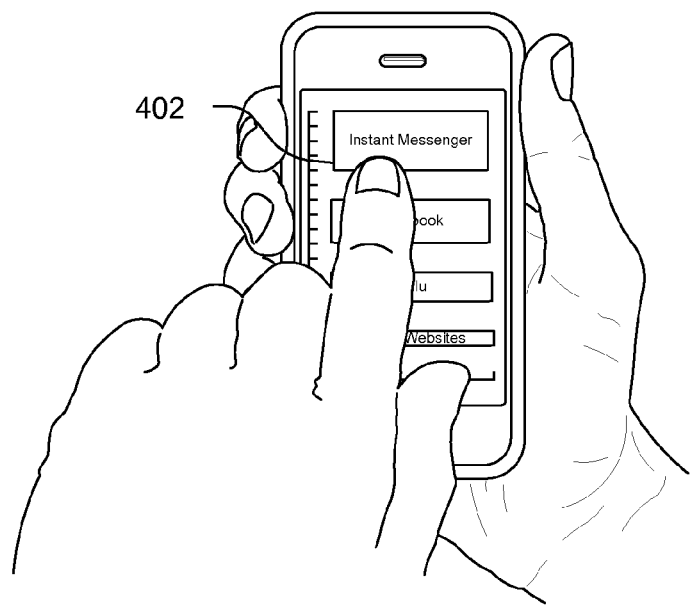
FIGS. 5A and 5B are diagrams showing how the interface in FIG. 4 may be used.
Figure 5B:
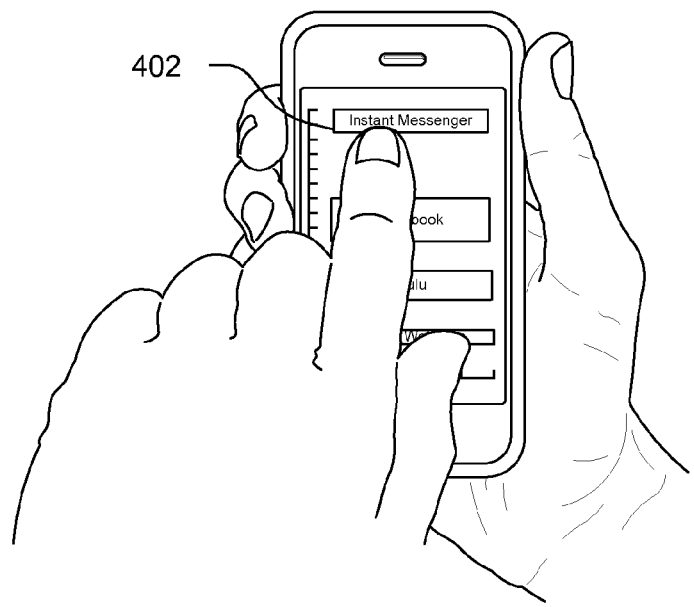

FIGS. 5A and 5B show an example of how a representation of a computing resource may be resized. As shown in FIGS. 5A and 5B, a user may use a touch-screen interface of computing device 202 to make instant messenger graphic 402 shorter, shrinking it from four units to one unit along the y-axis.

At step 308 in FIG. 3, one or more of the systems described herein may detect the new size of the representation of the computing resource. For example, detection module 110, which may be part of computing device 202 in FIG. 2, may detect the new size of the representation of the computing resource after the user resizes the representation of the computing resource.

Detection module 110 may detect the new size of the representation of the computing resource in a variety of different manners. For example, input module 108 may provide detection module 110 with data that indicates the new size of the representation of the computing resource. Additionally or alternatively, detection module 110 may query a database and/or access any other data resource to detect the new size of the representation of the computing resource. In some embodiments, detection module 110 may detect the new size of the representation of the computing resource as it is being resized. Alternatively, detection module 110 may detect the new size of the representation of the computing resource after the computing resource has been resized.

At step 310 in FIG. 3, one or more of the systems described herein may modify the initial access-control setting to establish an updated access-control setting that corresponds to the new size of the representation of the computing resource. For example, modification module 112 may modify the initial access-control setting to establish an updated access-control setting.

Modification module 112 may modify the initial access-control setting in many different ways. If an administrator decreases the size of the representation of the computing resource, modification module 112 may update the initial access-control setting such that the updated access-control setting is more restrictive than the initial access-control setting. For example, continuing with the example shown in FIGS. 5A and 5B, access to the instant messenger program may reduced from being limited to 40 times every four weeks to being limited to 10 times every four weeks when the administrator decreases the height of the instant messenger representation 402.

As another example, if an administrator decreases a width of a representation of a computing resource, a time frame for which an access-control setting is applied may be decreased. Using the example shown in FIGS. 5A and 5B, if an administrator decreases a width of instant messenger representation 402 by two units, the updated access-control setting may limit the resource to being accessed 10 times every two weeks instead of ten times every four weeks.

If an administrator increases the size of the representation of the computing resource, modification module 112 may update the initial access-control setting such that the updated access-control setting is less restrictive than the initial access-control setting. For example, if an administrator increases a height and/or width of a representation of a computing resource, a user may be allowed to access the computing resource more frequently and/or for longer periods of time.

Modification module 112 may modify an access-control setting in a suitable manner. In examples where the access-control setting is less restrictive (i.e., the representation of the computing resource has been enlarged), a user may be allowed to access the computing resource more frequently, for longer periods of time, may be permitted to view additional types of content (e.g., content with more mature ratings), may be allowed to spend a higher percentage of overall computer usage time accessing the computing resource, and/or may be allowed more access to the computing resource in any other way. In examples where the access-control setting is more restrictive (i.e., the representation of the computing resource has decreased in size), a user may be allowed to access the computing resource less frequently, for shorter periods of time, may be permitted to view less types of content, may be allowed to spend a lower percentage of overall computer usage time accessing the computing resource, and/or may be further restricted from using the computing resource in any other manner.

Figure 6:
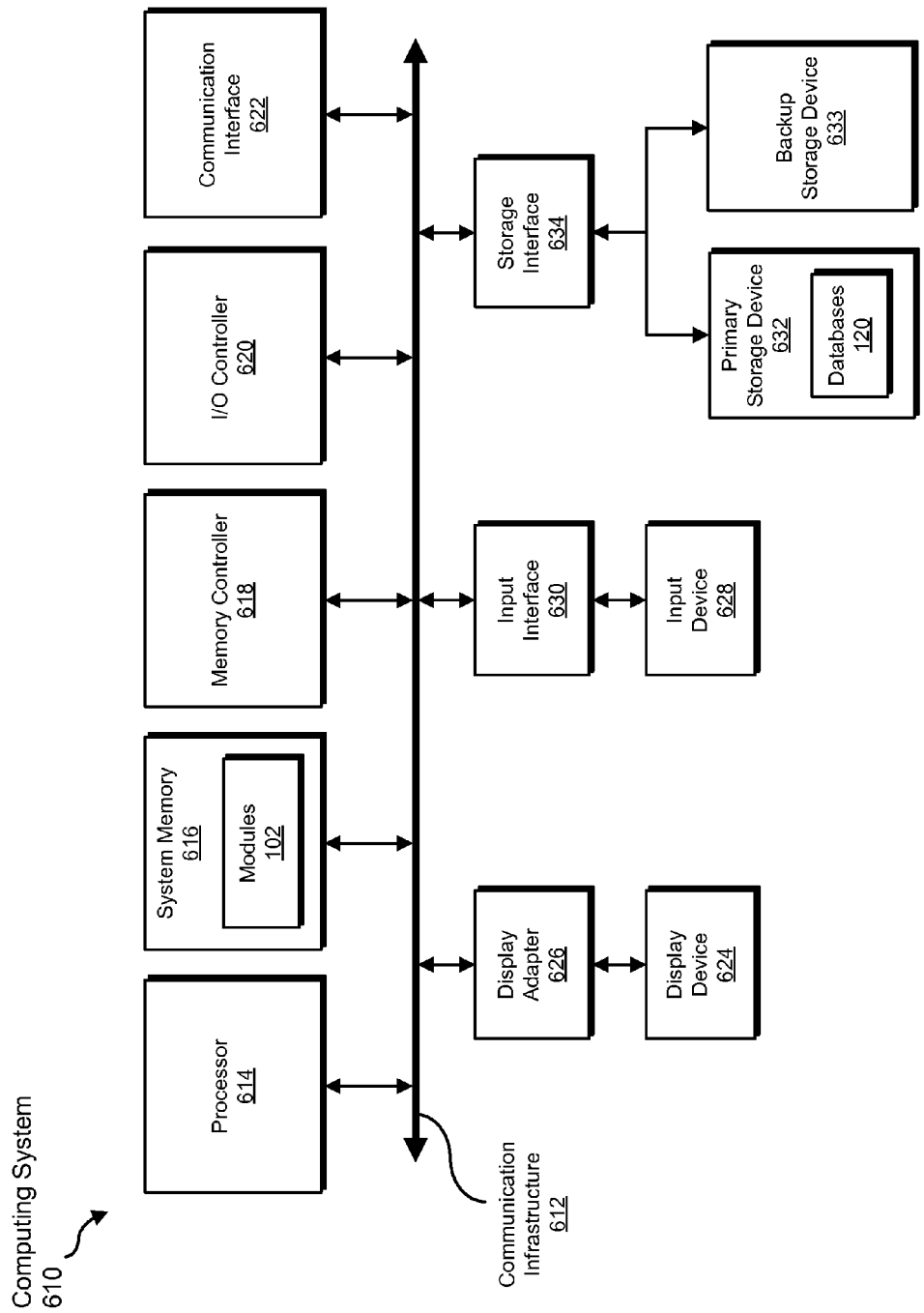
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, displaying, receiving, detecting, modifying, using, resizing, and determining steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, displaying, receiving, detecting, modifying, using, resizing, and determining.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, displaying, receiving, detecting, modifying, using, resizing, and determining steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, displaying, receiving, detecting, modifying, using, resizing, and determining steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, displaying, receiving, detecting, modifying, using, resizing, and determining steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, databases 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, displaying, receiving, detecting, modifying, using, resizing, and determining steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
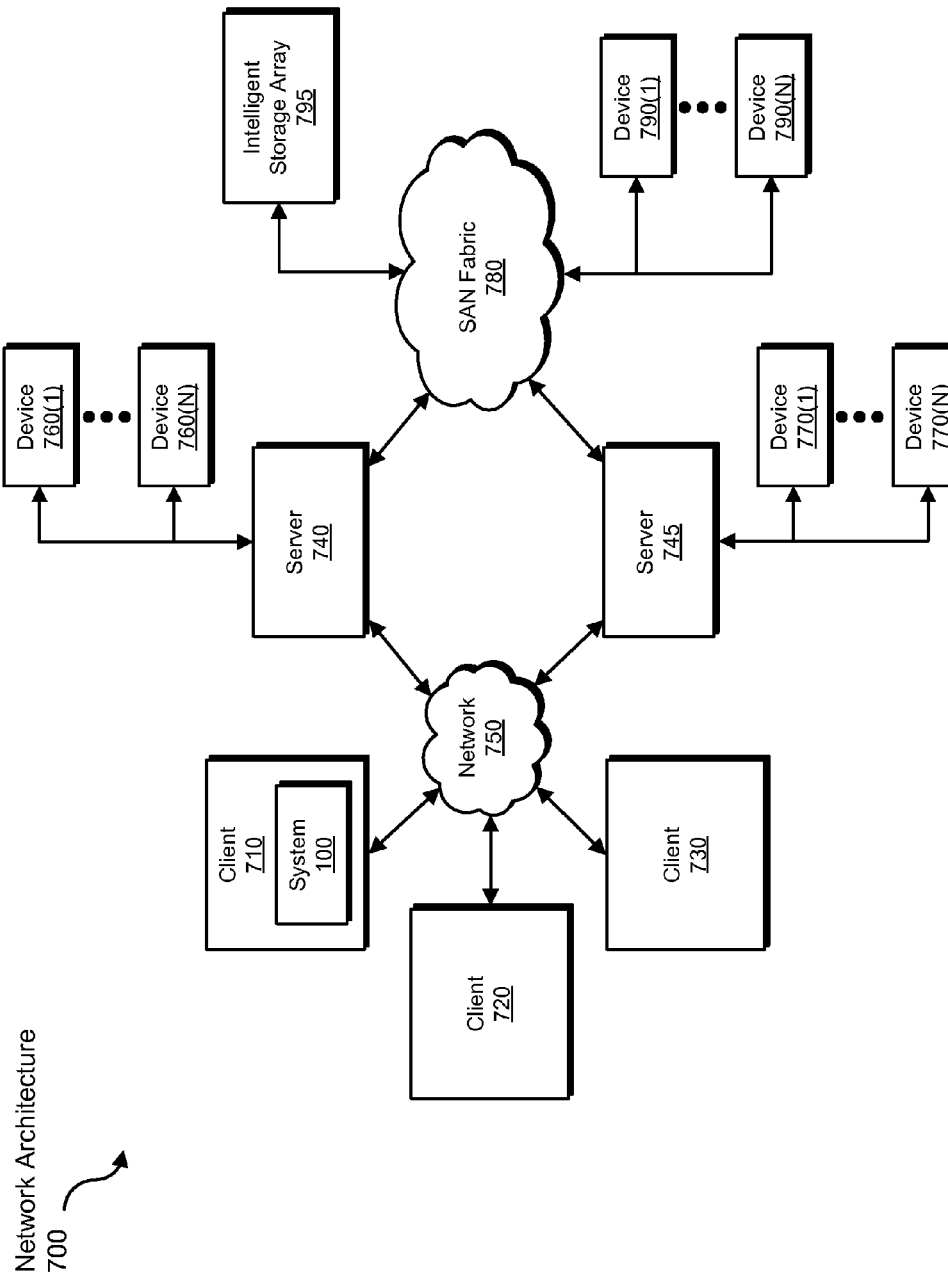
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, displaying, receiving, detecting, modifying, using, resizing, and determining steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for managing access-control settings.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device interface by enabling a parent to effectively and efficiently use the interface to change access-control settings, as described in detail above.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for managing access-control settings, at least a portion of the method being performed by a computing device comprising at least one processor, the method comprising:
    displaying, via a graphical user interface, a representation of an online resource by:
        identifying usage information that indicates how frequently a user accesses the online resource;
        using the usage information to select an initial size of the representation of the online resource; and
        displaying the representation of the online resource such that the initial size of the representation of the online resource corresponds to how frequently the user accesses the online resource, wherein the representation of the online resource comprises an icon;
    receiving input that resizes, along a y-axis, the representation of the online resource from the initial size to a new size, wherein the y-axis represents a usage limit of the online resource during a time period represented by an x-axis;
    detecting the new size of the representation of the online resource; and
    modifying an access-control setting to establish an updated access-control setting that corresponds to the new size of the representation of the online resource,
    wherein:
        receiving the input that resizes the representation of the online resource from the initial size to the new size comprises receiving input that reduces a height of the representation of the online resource;
        modifying the access-control setting to establish the updated access-control setting comprises reducing access to the online resource when receiving the input that reduces the height of the representation of the online resource; and
        reducing the access to the online resource comprises reducing a frequency with which the user is allowed to access the online resource.

2. The method of claim 1, wherein:
    the graphical user interface comprises a touch-screen interface; and
    the input that resizes the representation is received via the touch-screen interface.

3. The method of claim 1, wherein the online resource comprises a social networking website.

4. The method of claim 1, wherein the online resource comprises a cloud-based application.

5. The method of claim 1, wherein:
    receiving the input that resizes the representation of the online resource from the initial size to the new size comprises receiving input that increases a height of the representation of the online resource; and
    modifying the access-control setting to establish the updated access-control setting comprises increasing access to the online resource when receiving the input that increases the height of the representation of the online resource.

6. The method of claim 1, wherein:
    displaying the representation of the online resource comprises displaying a plurality of representations of online resources; and
    the plurality of representations of online resources are displayed in order according to a frequency with which the user accesses respective online resources, such that a first representation that is associated with a more frequently accessed online resource is displayed above and/or left of a second representation that is associated with a less frequently accessed online resource.

7. The method of claim 1, further comprising:
    determining that the online resource is accessed more frequently by the user than an additional online resource; and
    based on the determination that the online resource is accessed more frequently by the user than the additional online resource, displaying a representation of the additional online resource such that the representation of the additional online resource is smaller than the representation of the online resource.

8. The method of claim 1, wherein:
    the online resource comprises a website;
    the icon is associated with the website;
    the access-control setting comprises a parental-control setting;
    the user comprises a child associated with the parental-control setting; and
    the input that resizes the representation of the online resource comprises touch-screen input from a guardian of the child.

9. A system for managing access-control settings, the system comprising:
    a display module programmed to display, via a graphical user interface, a representation of an online resource by:
        identifying usage information that indicates how frequently a user accesses the online resource;
        using the usage information to select an initial size of the representation of the online resource; and
        displaying the representation of the online resource such that the initial size of the representation of the online resource corresponds to how frequently the user accesses the online resource, wherein the representation of the online resource comprises an icon;
    an input module programmed to receive input that resizes, along a y-axis, the representation of the online resource from the initial size to a new size, wherein the y-axis represents a usage limit of the online resource during a time period represented by an x-axis;
    a detection module programmed to detect the new size of the representation of the online resource;
    a modification module programmed to modify an initial access-control setting to establish an updated access-control setting that corresponds to the new size of the representation of the online resource; and at least one processor configured to execute the display module, the input module, the detection module, and the modification module, wherein:

the input module is programmed to receive input that resizes the representation of the online resource from the initial size to the new size by receiving input that reduces a height of the representation of the online resource;

the modification module is programmed to modify the access-control setting to establish the updated access-control setting by reducing access to the online resource when receiving the input that reduces the height of the representation of the online resource; and the modification module reducing the access to the online resource comprises reducing a frequency with which the user is allowed to access the online resource.

10. The system of claim 9, wherein:

the graphical user interface comprises a touch-screen interface; and the input that resizes the representation is received via the touch-screen interface.

11. The system of claim 9, wherein the online resource comprises a social networking website.

12. The system of claim 9, wherein the online resource comprises a cloud-based application.

13. The system of claim 9, wherein:

the input module is programmed to receive input that resizes the representation of the online resource from the initial size to the new size by receiving input that increases a height of the representation of the online resource; and the modification module is programmed to modify the initial access-control setting to establish the updated access-control setting by increasing access to the online resource when receiving the input that increases the height of the representation of the online resource.

14. The system of claim 9, wherein:

the display module is programmed to display the representation of the online resource by displaying a plurality of representations of online resources; and the plurality of representations of online resources are displayed in order according to a frequency with which the user accesses respective online resources, such that a first representation that is associated with a more frequently accessed online resource is displayed above and/or left of a second representation that is associated with a less frequently accessed online resource.

15. The system of claim 9, wherein:

the determination module is further programmed to determine that the online resource is accessed more frequently by the user than an additional online resource; and the display module is further programmed to, based on the determination that the online resource is accessed more frequently by the user than the additional online resource, display a representation of the additional online resource such that the representation of the additional online resource is smaller than the representation of the online resource.

16. The system of claim 9, wherein:

the online resource comprises a website;

the icon is associated with the website;

the access-control setting comprises a parental-control setting;

the user comprises a child associated with the parental-control setting; and the input that resizes the representation of the website comprises touch-screen input from a guardian of the child.

17. A non-transitory computer-readable-storage medium comprising one or more computer-executable instructions that, when executed by at least one processor of a computing device, cause the computing device to:

display, via a graphical user interface, a representation of an online resource by:

identifying usage information that indicates how frequently a user accesses the online resource;

using the usage information to select an initial size of the representation of the online resource; and displaying the representation of the online resource such that the initial size of the representation of the online resource corresponds to how frequently the user accesses the online resource, wherein the representation of the online resource comprises an icon;

receive input that resizes, along a y-axis, the representation of the online resource from the initial size to a new size, wherein the y-axis represents a usage limit for the online resource during a time period represented by an x-axis;

detect the new size of the representation of the online resource; and modify an access-control setting to establish an updated access-control setting that corresponds to the new size of the representation of the online resource, wherein:

receive the input that resizes the representation of the online resource from the initial size to the new size comprises receive input that reduces a height of the representation of the online resource;

modify the access-control setting to establish the updated access-control setting comprises reduce access to the online resource when receiving the input that reduces the height of the representation of the online resource; and reduce the access to the online resource comprises reduce a frequency with which the user is allowed to access the online resource.

* * * * *

UNITED STATES PATENT AND TRADEMARK OFFICE
CERTIFICATE OF CORRECTION

PATENT NO. : 8,949,720 B1
APPLICATION NO. : 13/103550
DATED : February 3, 2015
INVENTOR(S) : Aravinthan Narayanan and Yadvinder Bhatia It is certified that error appears in the above-identified patent and that said Letters Patent is hereby corrected as shown below:

In the claims
Claim 17, at column 18, lines 39 to 54, should read:
receiving the input that resizes the representation of the online resource from the initial size to the new size comprises receiving input that reduces a height of the representation of the online resource;
modifying the access-control setting to establish the updated access-control setting comprises reducing access to the online resource when receiving the input that reduces the height of the representation of the online resource; and
reducing the access to the online resource comprises reducing a frequency with which the user is allowed to access the online resource.

Signed and Sealed this
Fifteenth Day of December, 2015

Michelle K. Lee
*Director of the United States Patent and Trademark Office*